J. M. WHITALL.
Fruit Jar.
No. 32,594.
Patented Jan. 18, 1861.
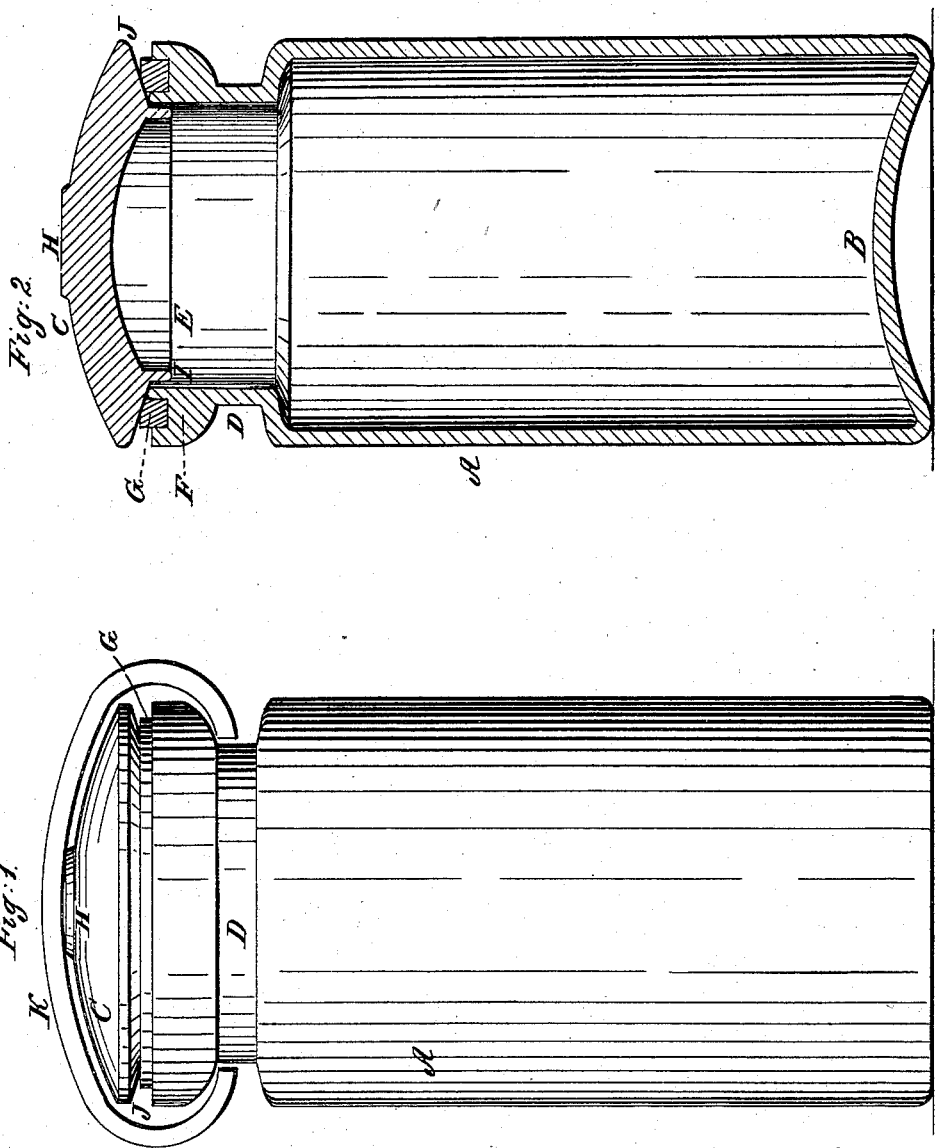

UNITED STATES PATENT OFFICE.

JOHN M. WHITALL, OF PHILADELPHIA, PENNSYLVANIA.

IMPROVEMENT IN PRESERVE-JARS.

Specification forming part of Letters Patent No. 32,594, dated June 18, 1861.

*To all whom it may concern:*

Be it known that I, JOHN M. WHITALL, of the city and county of Philadelphia, and State of Pennsylvania, have invented certain new and useful Improvements in Preserve-Jars; and I do hereby declare that the same are described and represented in the following specification and accompanying drawings.

The nature of my improvements in preserve-jars consists in arranging the packing in a groove around the mouth of the jar, and beveling the under side of the cover, so that it will press first and hardest on the inside corner of the packing-ring, in such a way and manner that after the jar is filled and closed, as the contents of the jar shrinks in cooling, the pressure of the air on the outside of the packing will press it (the packing) into the joint between the cover and jar and secure a tight joint.

To enable others skilled in the art to make and use my improvements, I will proceed to describe their construction and the mode of using them, referring to the drawings above mentioned, in which the same letters of reference indicate like parts in each of the figures.

Figure 1 is an elevation of the jar with my improvements. Fig. 2 is a sectional elevation of the jar, cut perpendicularly through the center.

In these drawings, A is the jar, made cylindrical, of glass, with a bottom, B, and top C. This jar is reduced at D, forming a neck, and the upper edge of the jar is spread and made thicker around the mouth E, as shown in the drawings; and there is a groove, F, in the upper edge, around the mouth of the jar, for the packing-ring G, made of india-rubber, which ring of packing is made so thick or deep as to project about one-eighth of an inch above the top of the jar before the cover is applied. The top of the cover C is made convex, as shown in the drawings, with a projection, H, in the center. The under side of the cover is provided with a rim, I, to enter the mouth of the jar and hold the cover in its proper position on the jar. The under side of the cover C, from the rim I to the edge, is beveled upward, as shown at J in Fig. 2 of the drawings, so as to press first and hardest on the inside edge of the packing-ring when the cover is applied to the jar, and make an air-tight joint with a moderate pressure on the cover. After the cover is applied the bent wire or hasp K is applied, as shown in the drawings, to hold the cover on.

In using this jar, heat the cover and jar before putting in the hot fruit. Then fill it with the hot fruit to within one-half or three-fourths of an inch of the top, and apply the cover and press it down, and put on the bent wire, which will hold it fast. When the contents of the jar cools and shrinks, so as to form a vacuum or partial vacuum, the pressure of the air forces down the cover, and at the same time presses the ring of packing into the joint between the jar and cover, holding it firm and tight. The packing-ring, being placed in a groove, is protected from injury.

I am aware that it is not new to make a groove around the mouth of a jar, nor to secure the cover with a bent wire or hasp, and also that a packing-ring of india-rubber has been used between the cover and the jar; but I believe it is new to bevel the under side of the cover, so as to make it press first and hardest on the inside corner of the packing-ring when it is applied to the jar.

I therefore claim as a new and improved article of manufacture—

A jar with a groove around its mouth, provided with an india-rubber ring, and provided with a top beveled on the under side, as described, for the purposes set forth.

JOHN M. WHITALL.

Witnesses:
C. BRAZU,
I. WISTAR EVANS.